United States Patent
Smith et al.

(10) Patent No.: US 11,140,230 B2
(45) Date of Patent: Oct. 5, 2021

(54) METHOD AND PROCEDURE FOR DYNAMIC SERVICES ORCHESTRATION THAT RUNS WITHIN AN ON-DEVICE SOFTWARE CONTAINER

(71) Applicant: RELIANCE JIO INFOCOMM USA, INC., Frisco, TX (US)

(72) Inventors: Nathan A. Smith, Frisco, TX (US); Mathew Oommen, Frisco, TX (US); Pallavur A. Sankaranaraynan, Frisco, TX (US)

(73) Assignee: RELIANCE JIO INFOCOMM USA, INC., Frisco, TX (US)

( * ) Notice: Subject to any disclaimer, the term of this patent is extended or adjusted under 35 U.S.C. 154(b) by 0 days.

(21) Appl. No.: 16/883,656

(22) Filed: May 26, 2020

(65) Prior Publication Data

US 2020/0287978 A1 Sep. 10, 2020

Related U.S. Application Data

(63) Continuation of application No. 16/036,366, filed on Jul. 16, 2018, now Pat. No. 10,666,745, which is a
(Continued)

(51) Int. Cl.
*H04L 29/08* (2006.01)
*H04W 4/21* (2018.01)
(Continued)

(52) U.S. Cl.
CPC .......... *H04L 67/16* (2013.01); *H04L 41/0803* (2013.01); *H04L 67/02* (2013.01);
(Continued)

(58) Field of Classification Search
CPC .......... G06F 21/32; G06F 21/31; G06F 21/10; G06F 21/34; G06F 21/6245; G06F 21/78;
(Continued)

(56) References Cited

U.S. PATENT DOCUMENTS

| 7,382,260 B2 | 6/2008 | Agarwal et al. |
| 7,401,131 B2 | 7/2008 | Robertson .............. G06Q 10/10 707/999.01 |

(Continued)

FOREIGN PATENT DOCUMENTS

| EP | 1179244 | 2/2002 |
| EP | 1179244 A1 | 2/2002 |

(Continued)

OTHER PUBLICATIONS

The International Search report and the Written opinion issued by Russian Federal Institute of Industrial Property Office dated Sep. 19, 2013 for the International Patent Application No. PCT/US2013/046640, 6 pages.
(Continued)

*Primary Examiner* — Michael A Keller
*Assistant Examiner* — Thao D Duong
(74) *Attorney, Agent, or Firm* — Jackson Walker LLP; Christopher J. Rourk

(57) ABSTRACT

A system for providing network services is provided. The system includes a device configured to interface with the network to receive a container, where the container is configured to interface with an operating system of the device and a plurality of applications operating on the device. The container is further configured to interface with a network services provider of one or more network services and one or more third party service providers.

20 Claims, 2 Drawing Sheets

Related U.S. Application Data continuation of application No. 15/489,629, filed on Apr. 17, 2017, now Pat. No. 10,027,769, which is a continuation of application No. 15/045,109, filed on Feb. 16, 2016, now Pat. No. 9,628,572, which is a continuation of application No. 13/922,045, filed on Jun. 19, 2013, now Pat. No. 9,264,304.

(60) Provisional application No. 61/662,237, filed on Jun. 20, 2012.

(51) Int. Cl.
    *H04W 4/50*      (2018.01)
    *H04W 4/60*      (2018.01)
    *H04L 12/24*     (2006.01)

(52) U.S. Cl.
    CPC .............. *H04L 67/20* (2013.01); *H04L 67/28* (2013.01); *H04W 4/21* (2018.02); *H04W 4/50* (2018.02); *H04W 4/60* (2018.02)

(58) Field of Classification Search
    CPC . G06F 21/79; H04L 63/0861; H04L 63/0428; H04L 63/083; H04L 63/12
    See application file for complete search history.

(56) References Cited

U.S. PATENT DOCUMENTS

| | | | |
|---|---|---|---|
| 7,496,360 B2 | 2/2009 | Sindhwani et al. | |
| 7,701,341 B2 | 4/2010 | Kumar et al. | |
| 7,774,485 B2 | 8/2010 | Patrick ............... | G06Q 30/00 709/229 |
| 7,822,860 B2 | 10/2010 | Brown ............... | H04L 29/06 707/609 |
| 7,944,355 B2 | 5/2011 | Kumar et al. | |
| 8,170,212 B2 | 5/2012 | Pering et al. | |
| 8,195,152 B1 | 6/2012 | Edwards | |
| 8,265,594 B2 | 9/2012 | Davis et al. | |
| 9,264,304 B2 | 2/2016 | Smith et al. | |
| 9,628,572 B2 | 4/2017 | Smith et al. | |
| 9,888,044 B2 | 2/2018 | Reddy et al. | |
| 9,959,425 B2 | 5/2018 | Singh et al. | |
| 10,004,021 B2 | 6/2018 | Pawar et al. | |
| 10,027,769 B2 | 7/2018 | Smith et al. | |
| 10,051,053 B2 | 8/2018 | Pandit et al. | |
| 10,102,362 B2 | 10/2018 | Singh et al. | |
| 10,123,360 B2 | 11/2018 | Pandit et al. | |
| 10,178,136 B2 | 1/2019 | Jayaraman et al. | |
| 10,178,554 B2 | 1/2019 | Pawar et al. | |
| 10,200,928 B2 | 2/2019 | Jamadagni et al. | |
| 10,212,627 B2 | 2/2019 | Reddy et al. | |
| 10,299,121 B2 | 5/2019 | Jamadagni et al. | |
| 2003/0033369 A1 | 2/2003 | Bernhard ............... | G06F 9/465 709/203 |
| 2004/0098306 A1 | 5/2004 | Fitzpatrick et al. | |
| 2005/0044058 A1 | 2/2005 | Matthews et al. | |
| 2005/0050301 A1 | 3/2005 | Whittle et al. | |
| 2006/0020904 A1 | 1/2006 | Aaltonen et al. | |
| 2007/0239819 A1 | 10/2007 | Woods ............... | G06Q 30/02 709/201 |
| 2008/0287062 A1 | 11/2008 | Claus et al. | |
| 2009/0228820 A1 | 9/2009 | Kim et al. | |
| 2010/0049874 A1 | 2/2010 | Chene ............... | H04L 67/1095 709/246 |
| 2012/0174093 A1 | 7/2012 | Davila et al. | |
| 2013/0219263 A1 | 8/2013 | Abrahami | |
| 2013/0347071 A1* | 12/2013 | Polo Moragon .... | H04L 63/0853 726/3 |
| 2015/0381633 A1* | 12/2015 | Grim ............... | H04L 63/08 726/4 |
| 2015/0382195 A1* | 12/2015 | Grim ............... | H04L 63/08 726/4 |

FOREIGN PATENT DOCUMENTS

| | | |
|---|---|---|
| RU | 2421811 | 6/2011 |
| RU | 2421811 C2 | 6/2011 |
| WO | 2013/061156 | 5/2013 |
| WO | 2013061156 A2 | 5/2013 |

OTHER PUBLICATIONS

The International Search report and the Written opinion issued by USPTO dated Sep. 30, 2015 for the International Patent Application No. PCT/US2015/038683, 10 pages.

The International Search report and the Written opinion issued by EPO dated Dec. 3, 2015 for the International Patent Application No. PCT/US2015/050276, 11 pages.

GSM Association, "VoLTE Service Description and Implementation Guidelines, Version 1.1", www.gsma.com/network2020/wp-com, Mar. 26, 2014, pp. 1-121.

Anonymous et al., "FRITZ!Box 6842 LTE: Der Alleskonner mil Voice-over-LTE", www.lte-anbieter.info/lte-news/ritzbox-6842-lte-der-alleskonner-mit-voice-over-lte, Feb. 27, 2013, 2 pages.

AVM GMBH, "FRITZ!Box 6842 LTE Einrichten und bedienen", img.billiger.de/dynimg/h5r90H8yeGyX90aFpmTDmHt4H9rycHjeBa9LTdXG2DA41-ZtYq5vi031VpqWBj4_HexpdHaC1z88YR5bxwk6-U/Bedienungsanleitung.pdf, May 1, 2014, pp. 1-212.

The International Search report and the Written opinion issued by Indian Patent Office dated Jun. 22, 2015 for the International Patent Application No. PCT/IB2015/050451, 7 pages.

The International Search report and the Written opinion issued by European Patent Office dated Oct. 20, 2016 for the International Patent Application No. PCT/US2016/044842, 11 pages.

Miller, "Facing the Challenge of Wireless Security", Computer, Jul. 2001, vol. m34, No. 7, pp. 16-18.

The International Bureau of WIPO, International Preliminary Report on Patentability, PCT Application No. PCT/US2013/046640, dated Dec. 31, 2014, 6 pages.

The International Search report and the Written opinion issued by European Patent Office dated Oct. 20, 2016 for the International Patent Application No. PCT/US2016/044842.

Miller, "Facing the Challenge of Wireless Security", Computer, 2002, pp. 16-18, vol. m34, No. 7.

The International Search report and the Written opinion issued by Russian Federal Institute of Industrial Property Office dated Sep. 19, 2013 for the International Patent Application No. PCT/US2013/046640.

The International Search report and the Written opinion issued by USPTO dated Sep. 30, 2015 for the International Patent Application No. PCT/US2015/038683.

The International Search report and the Written opinion issued by EPO dated Dec. 3, 2015 for the International Patent Application No. PCT/US2015/050276.

Anonymous et al., "FRITZ!Box 6842 LTE: Der Alleskönner mlt Voice-over-LTE", www.lte-anbieter.info/lte-news/fritzbox-6842-lte-der-alleskonner-mit-voice-over-lte, Feb. 27, 2013, pp. 1.

AVM GMBH, "FRITZ!Box 6842 LTE Einrichten and bedienen", img.billiger.de/dynimg/h5r90H8yeGyX90aFpmTDmHt4H9rycHjeBa9LTdXG2DA41-ZtYq5vi031VpqWBj4_HexpdHaC1z88YR5bxwk6-U/Bedienungsanleitung.pdf, May 1, 2014, pp. 1-212.

The International Search report and the Written opinion issued by Indian Patent Office dated Jun. 22, 2015 for the International Patent Application No. PCT/IB2015/050451.

The International Bureau of WIPO; International Preliminary Report on Patentability; PCT Application No. PCT/US2013/046640; dated Dec. 31, 2014.

Russian Patent Office; International Search Report and Written Opinion; PCT Application No. PCT/US2013/046640; dated Sep. 19, 2013.

* cited by examiner

METHOD AND PROCEDURE FOR DYNAMIC SERVICES ORCHESTRATION THAT RUNS WITHIN AN ON-DEVICE SOFTWARE CONTAINER

RELATED APPLICATIONS

The present application is a continuation of U.S. patent application Ser. No. 16/036,366, filed Jul. 16, 2018, which is a continuation of U.S. patent application Ser. No. 15/489,629, filed Apr. 17, 2017, which issued on Jul. 17, 2018 as U.S. Pat. No. 10,027,769, which is a continuation of Ser. No. 15/045,109, filed Feb. 16, 2016, which issued on Apr. 18, 2017 as U.S. Pat. No. 9,628,572, which is a continuation of U.S. patent application Ser. No. 13/922,045, filed Jun. 19, 2013, which issued on Feb. 16, 2016 as U.S. Pat. No. 9,264,304, which claims benefit of U.S. Provisional Application No. 61/662,237, filed Jun. 20, 2012, entitled "METHOD AND PROCEDURE FOR DYNAMIC SERVICES ORCHESTRATION THAT RUNS WITHIN AN ON-DEVICE SOFTWARE CONTAINER," which is hereby incorporated by references for all purposes as if set forth herein in its entirety.

TECHNICAL FIELD

The present disclosure relates to application software, and more specifically to a method and system for dynamic services orchestration that runs within an on-device software container.

BACKGROUND OF THE INVENTION

A runtime environment on a mobile device consists of a variety of native services and applications that are embedded into the mobile device operating system. For example, in the Android operating system, there are predefined services for specific applications such as Google Search and Google Navigation, and the policy framework is hard coded. The services and policy framework embedded within mobile device operating system are pre-defined and not extensible to be modified/updated by third party applications, which makes it impossible to easily modify or update the operation of the device to accommodate new applications.

SUMMARY OF THE INVENTION

A system for providing network services is provided. The system includes a device configured to interface with the network to receive a container, where the container is configured to interface with an operating system of the device and a plurality of applications operating on the device. The container is further configured to interface with a network services provider of one or more network services and one or more third party service providers.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE SEVERAL VIEWS OF THE DRAWINGS

Aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views, and in which.

DETAILED DESCRIPTION OF THE INVENTION

Figure 1:
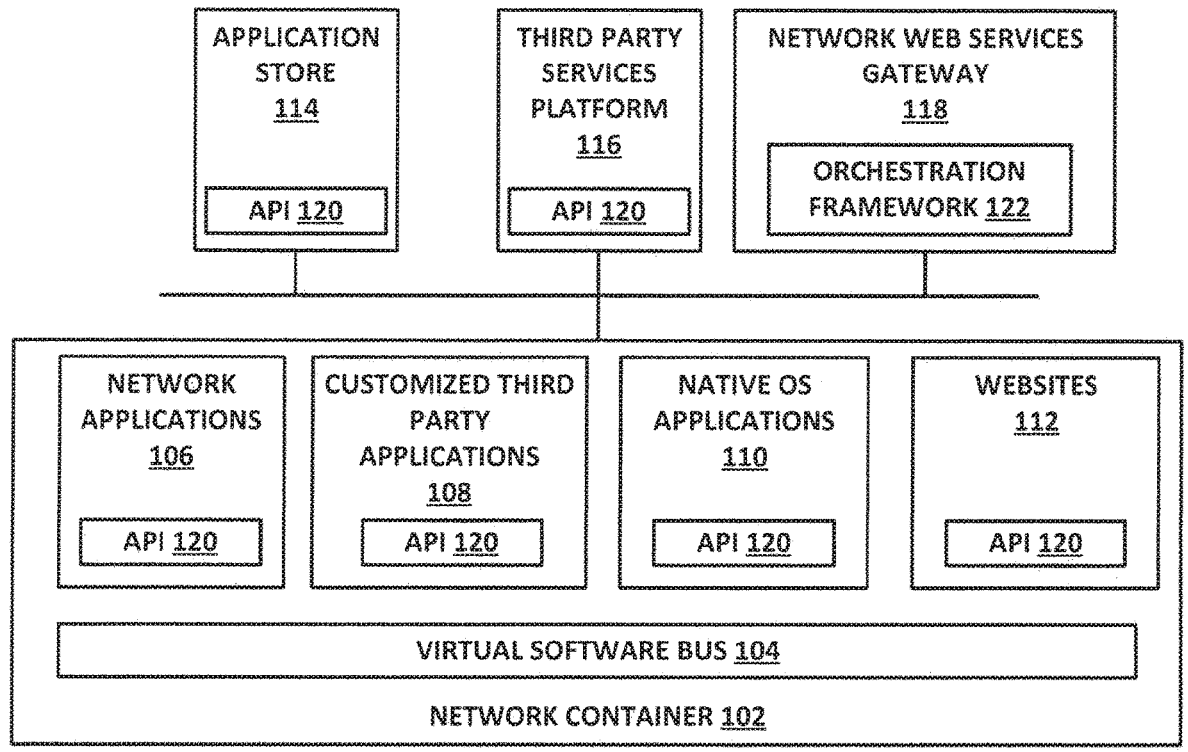
FIG. 1 is a diagram of a system for providing a dynamic services orchestration framework in accordance with an exemplary embodiment of the present disclosure.

In the description that follows, like parts are marked throughout the specification and drawings with the same reference numerals. The drawing figures might not be to scale and certain components can be shown in generalized or schematic form and identified by commercial designations in the interest of clarity and conciseness.

The present disclosure includes a means to provide access to a defined set of services on a user's mobile device through a trusted software environment that can enforce business policy as it relates to specific service access for each unique third party applications and personal policy that is defined by the customer's settings for the utilization of services within each application.

FIG. 1 is a diagram of a system 100 for providing a dynamic services orchestration framework in accordance with an exemplary embodiment of the present disclosure. System 100 can be implemented in hardware or a suitable combination of hardware and software, and can be one or more software systems operating on one or more processors.

As used herein, "hardware" can include a combination of discrete components, an integrated circuit, an application-specific integrated circuit, a field programmable gate array, or other suitable hardware. As used herein, "software" can include one or more objects, agents, threads, lines of code, subroutines, separate software applications, two or more lines of code or other suitable software structures operating in two or more software applications or on two or more processors, or other suitable software structures. In one exemplary embodiment, software can include one or more lines of code or other suitable software structures operating in a general purpose software application, such as an operating system, and one or more lines of code or other suitable software structures operating in a specific purpose software application. As used herein, the term "couple" and its cognate terms, such as "couples" and "coupled," can include a physical connection (such as a copper conductor), a virtual connection (such as through randomly assigned memory locations of a data memory device), a logical connection (such as through logical gates of a semiconducting device), other suitable connections, or a suitable combination of such connections.

System 100 includes network container 102, which further includes virtual software bus 104 that can allow a suitable application or service loaded within network container 102 to connect to application store 114, third party services platform 116, network web services gateway 118 or other suitable systems or services. In one exemplary embodiment, application store 114, third party services platform 116 and network web services gateway 118 can be implemented in hardware or a suitable combination of hardware and software, and can be one or more software systems operating on one or more processors, such as a dedicated server, a cloud-implemented service or in other suitable manners.

Virtual software bus 104 facilitates the transport of data between the applications and services operating within network container 102 and centralized orchestration framework 122, which can be hosted at network web services gateway 118 or in other suitable locations (such as a single server or a cloud service). Orchestration framework 122 behaves both as a proxy and broker for the messages from other applications and services running within network container 102. A single application programming interface (API) 120 is used by network applications 106, customized third party applications 108, native operating system (OS) applications 110, websites 112 and the associated services provided by these applications and websites to interface with definitions for the applications and services, and to provide information enabling orchestration framework 122 to create the context for a sequence of events that determines the brokering and chaining of API requests to the various backend systems associated with the applications and websites, such as application store 114, third party services platform 116 and network web services gateway 118.

Network container 102 can be installed on a user device, such as a cellular telephone or tablet computer, either by the customer as an application that is downloaded over the air (OTA) onto their device, can be integrated into software that is pre-loaded onto the user device, or can be otherwise provided. Orchestration framework 122 provides a trusted software environment to enforce policies common across all applications and services as well as policies that are unique to any application or service. A personal policy can be defined by or for the customer for the utilization of services within each application.

In one exemplary embodiment, orchestration framework 122 can provide the following functions:

enable applications and websites running on or accessed by a device with network container 102 to exchange information and interact with each other.

enable applications and websites running on or accessed by a device with network container 102 to request API calls through orchestration framework 122 that are then brokered into a cloud service orchestration composition layer (such as a web services enterprise service bus), to access network capabilities such as quality of service (QOS), to access core IT platforms such as operations support systems (OSS) and business support systems (BSS) for customer account, billing, provisioning, identity, device information or other suitable functionality.

enforce security policies for the services.

manage policies that have been defined for each application or website that has the ability to utilize specific network or third party services.

enable real time analytics to be provided on QOS metrics for network bandwidth, customer usage, application behavior or other function, such as for developers to utilize in their applications.

enable applications and websites running on a device with network container 102 to request API calls that are then brokered into a defined third party back end platform interface (such as third party payment, cloud storage, data read/write retrieval, or other suitable back end platform interfaces).

enforce personal policy for access to services.

enforce policy rules that define which services can by utilized by specified applications associated with an active user persona.

ensure that service API calls adhere to network technical standards.

enable service and policy rules to be updated dynamically (via push or pull update methodology).

enable the ability to change policy rules and enforcement dynamically to support scenarios such as an updated government privacy policy.

In one exemplary embodiment, network web services gateway 118 can update a service provided by or through a network application 106 from a first version to second version. In another exemplary embodiment, network web services gateway 118 can register services that can be utilized locally within the network on a device with network container 102, such as video, audio codecs, digital rights management or other suitable services. In another exemplary embodiment, network web services gateway 118 can registers service that are brokered by the network on a device with network container 102 to a back end network platform, such as third party payments, identity, news feeds, mapping, or other suitable services. In another exemplary embodiment, a third party can registers services that can be utilized locally within the network on a device with network container 102, such as video, audio codecs, digital rights management or other suitable services. In another exemplary embodiment, a third party can register services that are brokered by the network on a device with a network container 102 to a third party back end server, such as third party payments, identity, news feeds, mapping, or other suitable services. In another exemplary embodiment, network web services gateway 118 can publish a service such as VPN, private cloud access, enterprise email or other suitable services that can only be used by a device with network container 102.

Figure 2:
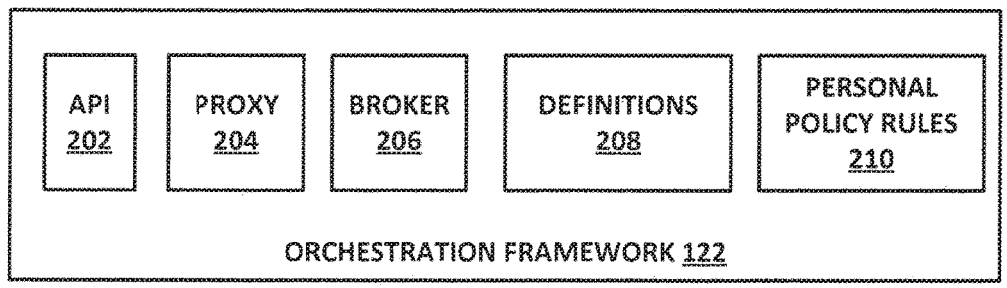
FIG. 2 is a diagram of a system for providing an orchestration framework in accordance with an exemplary embodiment of the present disclosure.

FIG. 2 is a diagram of a system 200 for providing an orchestration framework in accordance with an exemplary embodiment of the present disclosure. System 200 includes orchestration framework 122 and API 202, proxy 204, broker 206, definitions 208 and personal policy rules 210, each of which can be implemented as hardware or a suitable combination of hardware and software, and which can be one or more software systems operating on a processor.

API 202 allows system 200 to interface with network applications 106, customized third party applications 108, native OS applications 110 and websites 112 through their corresponding APIs 120.

Proxy 204 provides proxy functionality for the applications and services running within and in conjunction with network container 102, such as to allow those applications and services to readily interact with each other and to apply rules to the interaction between applications and services. In one exemplary embodiment, proxy 204 can ensure continuity of operation in the event of intermittent communications with the device upon which network container 102 is operating.

Broker 206 provides broker services for messages from applications and services running within and in conjunction with network container 102. In one exemplary embodiment, broker 206 manages workload queues for multiple receivers.

Definitions 208 are used to provide the definitions for messages between applications and services, such as to facilitate implementation of applications and services for use with a device having network container 102. In one exemplary embodiment, definitions 208 provides a centralized location for definitions, to allow the definitions to be easily updated and coordinated.

Personal policy rules 210 allows a user, system administrator or other suitable person or system to control personal policy rules settings, such as to control system or application data or functionality that a user can access, to control the data or account functionality of a user that can be accessed by an application or service, or to provide other suitable functions.

Figure 3:
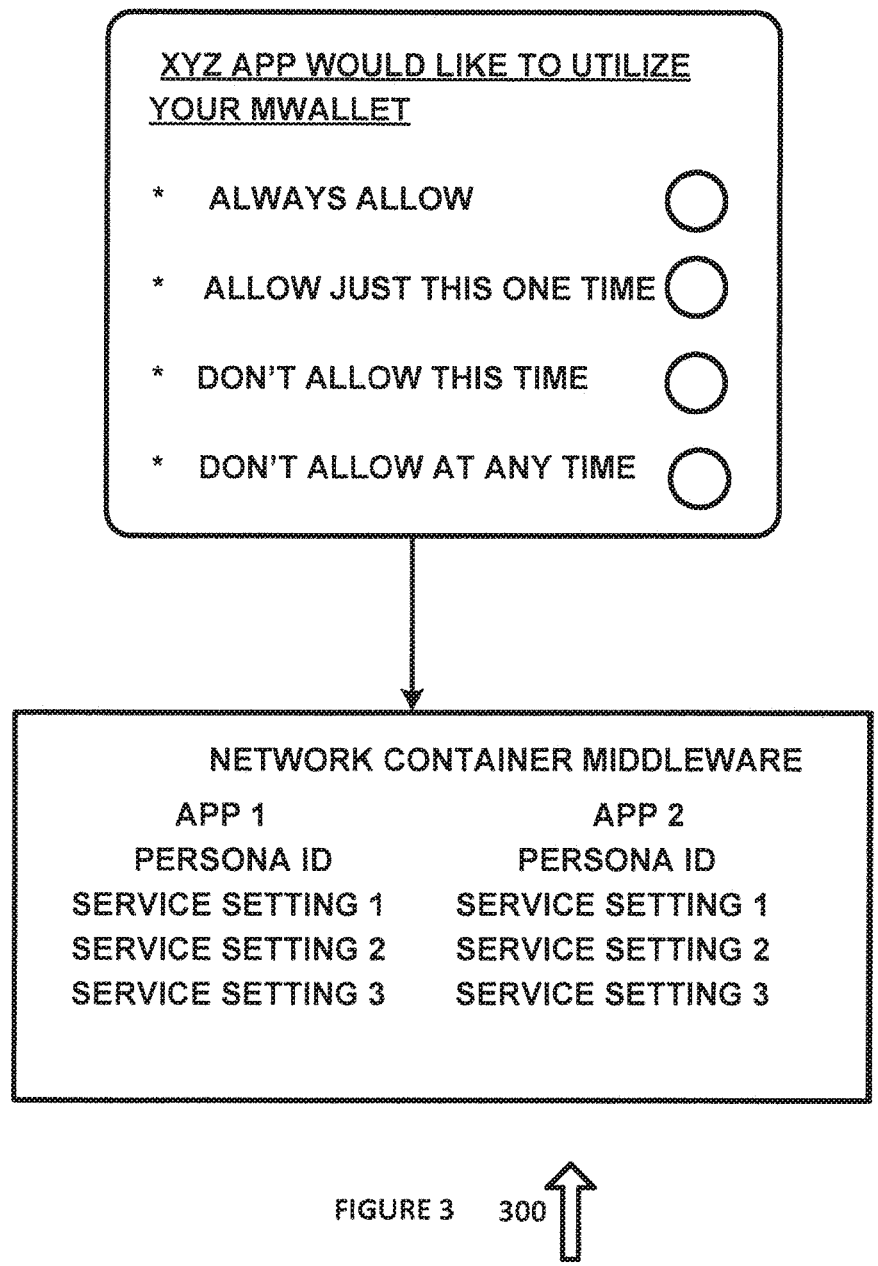
FIG. 3 is a diagram of a user settings control that can be enabled for user applications, such as to allow a user to configure their permissions settings for the services that an application can be used for each application that is running.

FIG. 3 is a diagram of a user settings control 300 that can be enabled for user applications, such as to allow a user to configure their permissions settings for the services that an application can be used for each application that is running. In one exemplary embodiment, user setting control 300 can be generated by a display of a user device, such as using a touch screen display or other suitable interactive displays, and can include one or more user-selectable controls that are implemented as one or more objects having association data, graphic and functional attributes. The selectable permission settings can be enforced by network web services gateway 118 or orchestration framework 122 for applications and services operating in conjunction with network container 122. In this manner, the user policy settings can be stored in a cloud environment and transferable with the user.

In another exemplary embodiment, a full screen widget, such as a panel, can be provided to have defined criteria and settings that can either be pre-configured by the application developer or network, or to be configured by the users.

An exemplary use case could include an enterprise panel created for an enterprise that includes a VPN client, email, cloud directory access, intranet web browser URL access and video conference calling app. In this enterprise panel, the IT administrator for the enterprise can define which applications that have specific access to a private set of services to log-on and access company cloud services through the company firewall. The IT administrator can also define rules where the panel can't be modified (such as to bring in additional icon shortcuts).

In another exemplary embodiment, a dynamic contextual based policy framework can be provided. Examples of contextual based policies include:
- time of day—such as to allow an employer to find an employee during the work day
- location—such as to allow children to make purchases while at their school
- relationship of users—such as to allow of transfer of money to other people within the user's account
- Persona—such as to only allow a user's gaming friends to see the user's gaming activities In another exemplary embodiment, the network on device services framework can be enabled to enforce a policy framework that is driven by a unique application ID that is assigned to permissions as granted by the network. If an application is requesting access to a service that it has not been granted permission to utilize by the network, then the network on device services framework can enforce the policy and not allow the user to access to the requested service.

In another exemplary embodiment, the network can be configured to upload bulk advertising that is targeted/optimized for the network broadband customer in the background to the network on device container of a user's device. The network container can have an advertising engine that will in real time broker and fulfill locally on the device, the applications advertising requests that are running in the network container. The network advertising engine can track all user behavior for the provided advertising and save the advertising delivery data for the network analytics platform.

In another exemplary embodiment, the ability to track all user activity of applications, websites and native OS apps and services running in the network container can be provided. User activity tracked can include the apps utilized, all screens accessed, services utilized and any interactions with other users. All user behavior for the provided advertising can be tracked and sent to the analytics platform.

In another exemplary embodiment, security for transactions can be enabled based on persona and access to specific services, within a persona such as business access to services, or in other suitable manners. For the transaction, a unique identifier within the data packets header can be utilized for specific level of security for access to services requiring strong protection such as payments, medical and financial information. The services orchestration layer can be utilized to create the unique identifier within the data packet header.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

What is claimed is:

1. A system, comprising:
    a plurality of computing nodes of a service provider that collectively provide services to a plurality of clients of the service provider via a service provider network, each of the computing nodes comprising at least one processor and a memory, and the services comprising a plurality of backend services provided for the plurality of clients;
    wherein one or more of the plurality of computing nodes implement an approval service that receives and manages approval requests pertaining to the backend services, wherein at least some approval requests trigger messages over the service provider network;
    a backend interface of the approval service for exchanging approval requests and approval results over the service provider network between the approval service and the backend services; and
    an administrator interface configured to manage approval requests transmitted via the backend interface to the approval service over the service provider network from one or more of the backend services provided for the client by the service provider, wherein the approval service is a different service than the one or more backend services that are sources of the approval requests;
    wherein the approval service is configured to:
    receive, through the administrator interface, a request to create an approval template;
    create the approval template;
    transmit, via the backend interface over the service provider network to the one of the one or more backend services, an indication of the result of the given approval request; and
    wherein the one or more backend services are configured to:
    trigger, based on receipt of the result of the given approval request, performance of an action associated with one or more of the computing resources.

2. The system of claim 1, wherein the one or more approval requests are related to a particular service.

3. The system of claim 2 wherein the approval template is associated with one or more other approval requests that are related to a different service.

4. The system of claim 1, wherein the approval template defines a sequence of two or more approval levels.

5. A method, comprising:
performing, by one or more service provider computers of a service provider network that implement an approval service that receives and manages approval requests pertaining to provisioning, administering, or managing computing resources on behalf of one or more backend services of the service provider for a plurality of clients of the service provider, at least some approval requests triggering messages between the approval service and one or more members over a network external to the service provider network on behalf of the backend services:
providing a backend interface of the approval service within the service provider network for the backend services for exchanging approval requests and results over the service provider network between the approval service and a different service;
receiving, by the approval service, via the backend interface over the service provider network from the different service on behalf of a client of the plurality of clients of the service provider, an approval request, wherein the approval request specifies a service provider product or service for which an authorization to access or utilize the service provider product or service is sought or an action for which authorization to perform the action is sought;
receiving, over the external network, a respective response to the approval request; determining, dependent on the received responses and a pre-determined criteria for approval or denial of the approval request, a result of the approval request; and
transmitting, over the service provider network to the different service, an indication of the result of the approval request, wherein the result of the approval request triggers performance of an action associated with provisioning, administering, or managing computing resources.

6. The method of claim 5, wherein the pre-determined criteria comprise a pre-determined voting strategy.

7. The method of claim 6 wherein the method further comprises, prior to said receiving the approval request creating an approval template on behalf of the client of the service provider.

8. The method of claim 7 further comprising associating the approval template with the approval request.

9. The method of claim 8 further comprising wherein the approval template defines the pre-determined voting strategy.

10. The method of claim 5, wherein the approval template is associated with one or more other approval requests by the approval service.

11. The method of claim 5, wherein the approval template defines a sequence of two or more approval levels.

12. The method of claim 5, wherein said determining the result of the approval request comprises assigning a default result for the approval request in response to a pre-determined amount of time passing without receiving enough responses to the approval request.

13. The method of claim 5, wherein the client of the service provider consumes services provided by the service provider, including the approval service and the different service.

14. The method of claim 5, wherein the client of the service provider consumes services provided by the service provider, including the approval service and the different service.

15. The method of claim 14, wherein the method further comprises, prior to receiving the approval request, receiving, from an administrator of the client, a request to create the approval template on behalf of the client.

16. The method of claim 15 further comprising creating the approval template.

17. The method of claim 16 further comprising receiving, from an administrator of the client, a request to associate the approval template with a specified product, portfolio, project, action, message topic, workflow, or request type.

18. The method of claim 17 further comprising associating the approval template with the specified product, portfolio, project, action, message topic, workflow, or request type.

19. A non-transitory computer-readable storage medium storing program instructions that when executed on one or more computers cause the one or more computers to implement an approval service, wherein the approval service is configured to:
present a backend interface of the approval service within a service provider network through which one or more other services submit respective approval requests that pertain to provisionment, administration, or management of computing resources, the approval requests to be managed by the approval service on behalf of each of two or more clients of a service provider that provides at least the one or more other services for the two or more clients, wherein the two or more clients are consumers of the one or more other services, wherein at least some approval requests trigger messages between the approval service and one or more members over a network external to the service provider network on behalf of the services;
receive, over the service provider network from one of the one or more other services, via the backend interface, a given approval request, wherein the given approval request is related to a particular product, portfolio, project, action, message topic, workflow, or request type; determine a result of the given approval request dependent, at least in part, on the respective responses to the given approval request;
receive, over the service provider network via the backend interface, another approval request, wherein the other approval request is related to a different product, portfolio, project, action, message topic, workflow, or request type;
determine a result of the other approval request dependent, at least in part, on the respective responses to the other approval request; and
transmit, over the service provider network via the backend interface to the one of the one or more other services, an indication of the result of the other approval request, wherein the result of the approval request triggers performance of an action associated with provisioning, administering, or managing computing resources.

20. The non-transitory computer-readable storage medium of claim 19, wherein the given approval request is associated with a given approval template that defines a voting strategy for approval or denial of approval requests that are associated with the given approval template.

\* \* \* \* \*